United States Patent
Haga et al.

(10) Patent No.: US 7,474,366 B2
(45) Date of Patent: Jan. 6, 2009

(54) COLOR LIQUID CRYSTAL DISPLAY DEVICE

(75) Inventors: Shuichi Haga, Kanagawa (JP);
Tatsuhiko Matsumoto, Tokyo (JP);
Tsuneo Kusunoki, Kanagawa (JP);
Takahiro Igarashi, Kanagawa (JP);
Yoshihide Shimpuku, Kanagawa (JP);
Takehiro Nakatsue, Kanagawa (JP)

(73) Assignee: Sony Corporation, Tokyo (JP)

( * ) Notice: Subject to any disclaimer, the term of this patent is extended or adjusted under 35 U.S.C. 154(b) by 388 days.

(21) Appl. No.: 11/384,780

(22) Filed: Mar. 20, 2006

(65) Prior Publication Data
US 2006/0227260 A1    Oct. 12, 2006

(51) Int. Cl.
*G02F 1/1335*    (2006.01)
(52) U.S. Cl. .............. 349/61; 349/70; 349/97; 349/106; 349/109
(58) Field of Classification Search .............. None
See application file for complete search history.

(56) References Cited

U.S. PATENT DOCUMENTS

| | | | |
|---|---|---|---|
| 5,475,512 A * | 12/1995 | Nakazawa et al. ............ 359/13 |
| 6,055,033 A * | 4/2000 | Yamaguchi et al. ......... 349/101 |
| 6,697,134 B2 * | 2/2004 | Watanabe et al. ............ 349/102 |
| 2005/0219443 A1 * | 10/2005 | Tanaka et al. ............... 349/106 |
| 2006/0164580 A1 * | 7/2006 | Ueda et al. .................. 349/117 |
| 2008/0111960 A1 * | 5/2008 | Yoshida et al. .............. 349/117 |

* cited by examiner

*Primary Examiner*—Tina M Wong
(74) *Attorney, Agent, or Firm*—Wolf, Greenfield & Sacks, P.C.

(57) ABSTRACT

A color liquid crystal display device capable of displaying a large color gamut is provided.

A color liquid crystal display device 100 includes: a transmissive color liquid crystal panel 10 having a color filter and a backlight light source 20, in which the backlight light source 20 includes a fluorescent lamp 21 of large color reproduction range, a color filter 19 is made of color filters of three primary colors that select the wavelength to transmit red light, green light and blue light, and the filter of each color has a spectroscopic characteristic suitable for the spectrum of the fluorescent lamp 21 of large color reproduction range.

12 Claims, 14 Drawing Sheets

COLOR LIQUID CRYSTAL DISPLAY DEVICE

CROSS REFERENCES TO RELATED APPLICATIONS

The present invention contains subject matter related to Japanese Patent Application JP 2005-071575 filed in the Japanese Patent Office on Mar. 14, 2005, the entire contents of which being incorporated herein by reference.

1. Field of the Invention

The present invention relates to a color liquid crystal display device including a color liquid crystal display panel and a liquid crystal display backlight light source that illuminates the color liquid crystal display panel from the rear side.

2. Description of the Related Art

Lately, a display (image display device) represented by an LCD (Liquid Crystal Display) device and PDP (Plasma Display Panel) has been made thinner.

Particularly, a color LCD device using a color LCD panel is capable of being driven with low power consumption, and therefore further development thereof in the future is expected in accordance with reduction in the cost of a large-screen color LCD panel.

With respect to the color LCD device, what is called a backlight system is mainly used in which a transmissive color LCD panel is illuminated from the rear side with a backlight device to display a color image.

A CCFL (Cold Cathode Fluorescent Lamp) using a fluorescent lamp to emit white light is typically used as a light source of the backlight device (refer to Patent Document 1, for example).

In the sRGB standard defined as a standard color space used for a computer display, the relation between a video signal RGB and a colorimetric value is clearly defined by making chromaticity points of three primary colors of RGB correspond with the colorimetric parameter of Rec.709 recommended by ITU, and in the display (image display device) conforming to the sRGB standard, the same color can be colorimetricly displayed if the same video signal RGB is given.

Hereupon, in an image apparatus such as a display device or printer, in which color information captured with a camera or scanner is received and displayed, needs to display the captured color information precisely.

For example, even if the camera had captured the color information precisely, color reproducibility of the whole system may deteriorate if the display device displays inappropriate color information.

Further, recently, there is a trend of making the display device thinner as represented by a liquid crystal TV and PDP, and a liquid crystal panel is mainly used in the display devices for mobile use. In the LCD panel, it is also desired to reproduce original colors with accuracy.

Although display with a standard monitor is typically defined by a color gamut of the sRGB standard described above, a number of colors that exceed the color gamut of sRGB exist, and there is an object color not being displayed with a standard monitor of the sRGB standard.

Then, in order to support a large color gamut, a sYCC standard having a larger color space than the sRGB standard has been standardized in the industry. The sYCC standard is the one in which the luminance color difference separate space is obtained from the sRGB standard by using the ITU-R BT. 601 (international standard of conversion matrix from RGB to YCC defined for high-definition display), and since the sYCC standard has a larger color gamut than the sRGB as the color space, color outside the sRGB standard can also be expressed.

On the other hand, a standard of NTSC (National Television System Committee) system adapted as a broadcasting system for a color television set has a large bandwidth in comparison with the sRGB standard.

Accordingly, in order to display the color gamut of the sYCC, it is necessary to have the same color gamut of the NTSC system or to exceed the color gamut of the NTSC system on the display.

Typically, in the transmissive color LCD device, for example, a color filter made of filters of three primary colors of a blue filter $CFB_0$ (465 nm), green filter $CFG_0$ (525 nm) and red filter $CFR_0$ (615 nm) having the spectroscopic characteristics (spectrum characteristics) shown in FIG. 1 is provided for each pixel of the color LCD panel.

In order to compensate for a low visibility of blue light by human beings, a typical red color filter $CFR_0$ is formed to have a predetermined transmissivity in the wavelength transmission band of the blue filter $CFB_0$.

White light emitted to the color filter having the above spectroscopic characteristics from the CCFL of three-wavelength gamut type used as the light source of the backlight device in the color LCD device shows the spectrum as shown in FIG. 2 and includes light of different strength in various wavelength bands.

Accordingly, color which is reproduced by combining the backlight device having such CCFL of three-wavelength gamut type as the light source and the color LCD panel including the color filter described above has the problems such as color mixture, and considerable deterioration of the color purity.

FIG. 3 is a diagram in which the spectroscopic characteristics of the color filter shown in FIG. 1 and the spectrum of the CCFL shown in FIG. 2 are combined to be shown.

As shown in FIG. 2, a CCFL typically used (typical CCFL) has a sub-peak around 490 nm.

Then, as shown in FIG. 3, since the transmission bands of the blue and green filters include this sub-peak, blue color and green color are mixed to thereby make the color purity deteriorated.

Further, FIG. 4 shows the color reproduction range of the color LCD device that includes the backlight device in which the CCFL of three-wavelength gamut type described above is the light source. FIG. 4 is the xy chromaticity diagram of the XYZ color system defined by CIE (International Commission on Illumination).

A color reproduction range of the color LCD device that includes the backlight device having the CCFL as the light source is almost equal to that of a CRT (Cathode Ray Tube) of the past, and is almost the same range as the color reproduction range of the sRGB standard, as shown in FIG. 4.

However, since a vertex on the color reproduction range of a triangle, namely, a chromaticity point of green area is at the position on the left side of a chromaticity point of green area of the sRGB standard (that is, x coordinate is small), part of the color reproduction range of the sRGB standard is not included in the area on the right side of the chromaticity point of the green area. It is conceivable that the color mixture of blue and green described above has been caused.

Further, the color reproduction range of the color LCD device that includes the backlight device having the CCFL as the light source is narrower than the color reproduction range (not shown) defined by the NTSC (National Television System Committee) standard which is employed as the color television broadcasting standard.

Therefore, there is a problem of not sufficiently corresponding to the present TV broadcasting.

Patent Document 1: Japanese Published Patent Application No. 2001-22285.

SUMMARY OF THE INVENTION

Then, the color gamut of the CCFL is made to expand, as described above, similarly to the space of the NTSC standard having larger color gamut than the sRGB.

Previously, the applicants of the present invention have proposed a CCFL (Cold Cathode Fluorescent Lamp) of large color gamut with which large color gamut can be expressed by improving part of a fluorescent material, for example.

By using the CCFL of large color gamut, the color gamut capable of being displayed is expanded in comparison with the CCFL of the related art.

However, in the case where the CCFL of large color gamut is combined with the color filter of the past, area of sRGB is not completely covered.

Particularly, area of green is greatly deviated.

Therefore, in order to cover the sRGB area of the past while obtaining the expansion of color gamut with respect to the CCFL of large color gamut, it is necessary to combine the color filter suitable for the CCFL of large color gamut of the light source.

Hence, the present invention provides a color LCD device capable of displaying a large color gamut.

A color liquid crystal display device according to an embodiment of the present invention includes: a transmissive color liquid crystal display panel having a color filter, and a liquid crystal display backlight light source which illuminates the color liquid crystal display panel from the rear side, in which the backlight light source includes a fluorescent lamp in which a chromaticity point of white light emitted is in the vicinity of (x, y)=(0.275, 0.275) in the xy chromaticity diagram of the XYZ color system; the color filter is made of color filters of three primary colors that select the wavelength to transmit red light, green light and blue light; and at least the peak wavelength of the blue filter that selects the wavelength to transmit blue light is 420 nm or more and 455 nm or less.

According to the above described color liquid crystal display device (hereinafter called color LCD device) of the present invention, since the backlight light source includes the fluorescent lamp in which the chromaticity point of white light emitted is in the vicinity of (x, y)=(0.275, 0.275) in the xy chromaticity diagram of the XYZ color system, the color gamut of the color reproduction range of the color LCD device can be made large in comparison with the case using the fluorescent lamp of the past.

Further, since at least the peak wavelength of the blue filter that selects the wavelength to transmit blue light in the filters of the three primary colors is 420 nm or more and 455 nm or less, the peak wavelength is shorter than that of the blue filter typically used (peak wavelength is 465 nm) and transmissivity of the blue filter around the wavelength from 500 nm to 530 nm of the transmissive wavelength band of the green filter becomes low, and so the color mixture of blue and green can be reduced.

A color liquid crystal display device according to an embodiment of the present invention includes: a transmissive color liquid crystal display panel having a color filter, and a liquid crystal display backlight light source which illuminates the color liquid crystal display panel from the rear side, in which the backlight light source includes the fluorescent lamp in which a chromaticity point of white light emitted is in the vicinity of (x, y)=(0.275, 0.275) in the xy chromaticity diagram of the XYZ color system, the color filter is made of color filters of three primary colors that select the wavelength to transmit red light, green light and blue light, and at least the peak wavelength of the green filter that selects the wavelength to transmit green light is 530 nm or more and 550 nm or less.

According to the above described color LCD device of the present invention, since the backlight light source includes the fluorescent lamp in which the chromaticity point of white light emitted is in the vicinity of (x, y)=(0.275, 0.275) in the xy chromaticity diagram of the XYZ color system, the color gamut of the color reproduction range of the color LCD device can be made large in comparison with the case using the fluorescent lamp of the past.

Further, since at least the peak wavelength of the green filter that selects the wavelength to transmit green light in the filters of the three primary colors is 530 nm or more and 550 nm or less, the peak wavelength is longer than that of the green filter typically used (where the peak wavelength is 525 nm) and the chromaticity point of green color is positioned on the longer wavelength side, and so the color mixture of green and blue can be reduced.

A color liquid crystal display device according to an embodiment of the present invention includes: a transmissive color liquid crystal display panel having a color filter, and a liquid crystal display backlight light source which illuminates the color liquid crystal display panel from the rear side, in which the backlight light source includes the fluorescent lamp in which a chromaticity point of white light emitted is in the vicinity of (x, y)=(0.275, 0.275) in the xy chromaticity diagram of the XYZ color system, the color filter is made of color filters of three primary colors that select the wavelength to transmit red light, green light and blue light, and at least the rising wavelength of the red filter that selects the wavelength to transmit red light is 570 nm or in the vicinity of 570 nm and the transmissivity thereof is almost zero at the wavelength 400 nm or more and 500 nm or less.

According to the above described color LCD device of the present invention, since the backlight light source includes the fluorescent lamp in which the chromaticity point of white light emitted is in the vicinity of (x, y)=(0.275, 0.275) in the xy chromaticity diagram of the XYZ color system, the color gamut of the color reproduction range of the color LCD device can be made large in comparison with the case using the fluorescent lamp of the past.

Further, since at least the transmissivity of the red filter that selects the wavelength to transmit red light in the filters of the three primary colors is almost zero at the wavelengths 400 nm or more and 500 nm or less, light having the wavelength 400 nm or more and 500 nm or less that is the transmissive wavelength range of the blue filter is not transmitted through the red filter, and so the color mixture of red and blue can be reduced.

According to the above described embodiments of the present invention, since mixture of green and blue or mixture of red and blue is reduced, color gamut of each color in which the color mixture is reduced can be expanded.

With this, color reproduction range of the color LCD device is further expanded compared with that of the past, and the display of large color gamut becomes possible.

Furthermore, the color space of sRGB standard can completely be covered, with each filter of three primary colors having the spectroscopic characteristics improved corresponding to the spectrum of the CCFL of large color gamut, for example.

BRIEF DESCRIPTION OF THE DRAWINGS

These and other objects and features of the present invention will become clear from the following description of the preferred embodiments given with reference to the accompanying drawings, in which.

DESCRIPTION OF THE PREFERRED EMBODIMENTS

At first, prior to the specific explanation of an embodiment of the present invention, the present invention is generally explained.

As described above, in the case where the color LCD device is formed by combining the CCFL of large color gamut and the color filters of the past, the sRGB area may not completely be included.

Figure 5:
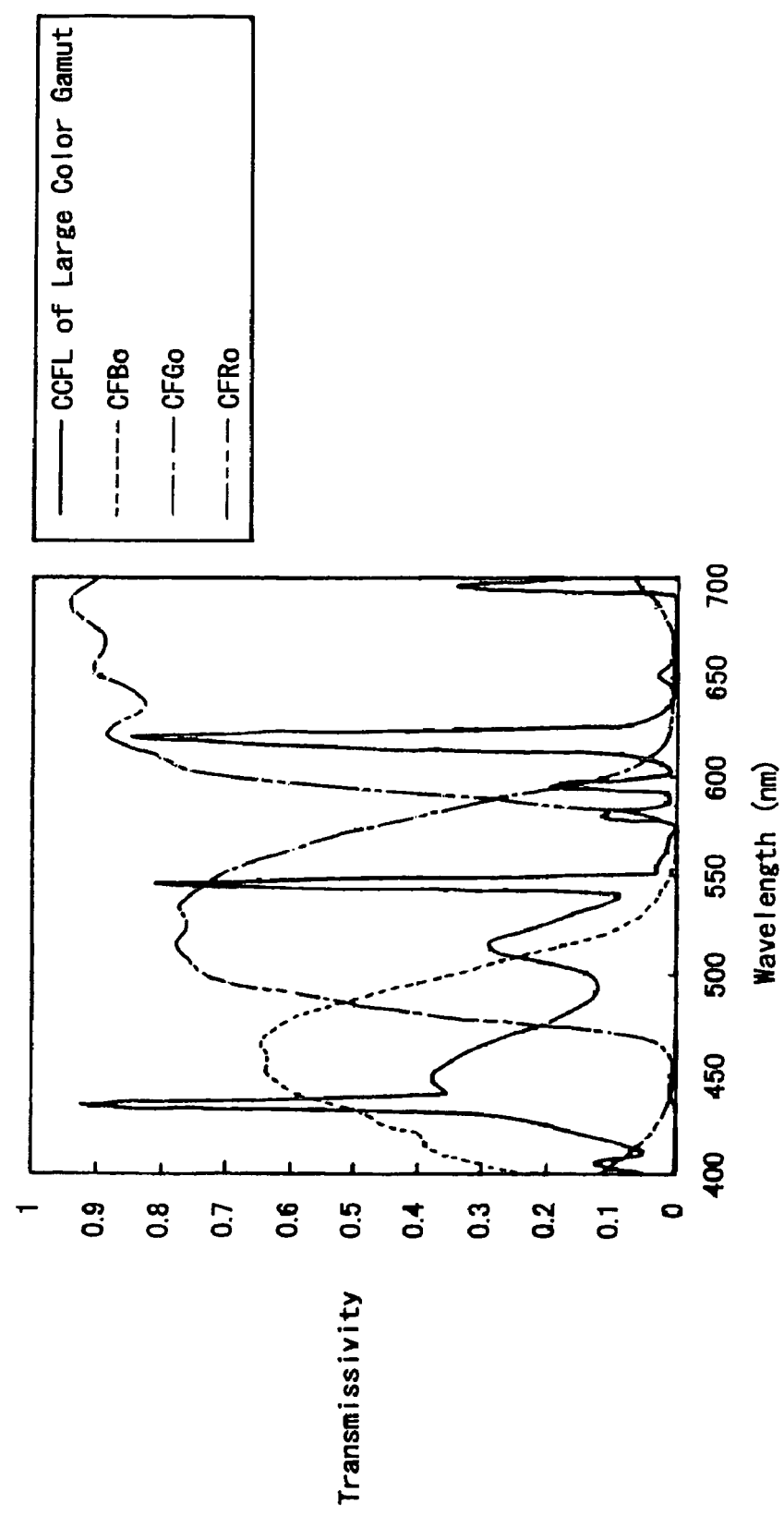
FIG. 5 is a diagram in which the spectrum of the CCFL of large color gamut and the spectroscopic characteristics of the color filters of the past are superimposed.

Here, FIG. 5 shows a diagram in which the spectrum of the CCFL of large color gamut and the spectroscopic characteristics of the color filters of the past ($CFR_o$, $CFG_o$, $CFB_o$) are superimposed.

As shown in FIG. 5, in the CCFL of large color gamut, there is a wide sub-peak in the range of 500 nm to 550 nm instead of the sub-peak around 490 nm that exists in a typical CCFL. Since the blue filter $CFB_o$ covers the sub-peak, leakage of green is caused in the color gamut of blue and so the color gamut of blue does not expand.

Further, since the green filter $CFG_o$ covers the spectrum of blue of the CCFL of large color gamut, leakage of blue is caused in the color gamut of green and so the color gamut of green deviates.

Furthermore, since the red filter $CFR_o$ absorbs light in the area on the short wavelength side (wavelength of 400 nm to 450 nm), blue is leaked to the color gamut of red and so the color gamut of red is reduced due to the color mixture.

Figure 6A:
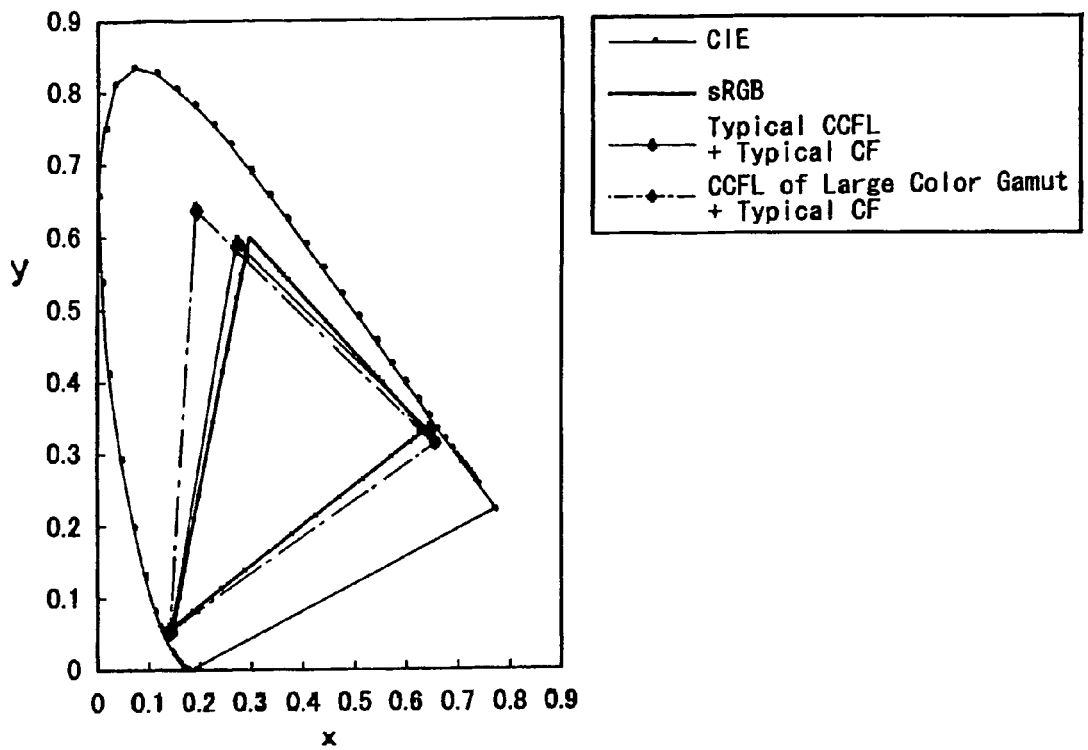
FIG. 6A is a diagram showing color reproduction range of the color LCD device in which the spectrum of the CCFL of large color gamut and the color filters of the past are combined and FIG. 6B is a diagram showing the area of green in FIG. 6A in an enlarged manner.

FIG. 6A shows color reproduction range of the color LCD device in which the CCFL of large color gamut and the color filter of the past (typical CF) are combined. In addition, FIG. 6A shows the color reproduction range of the color LCD device in which the typical CCFL and the typical CF are combined, to be compared.

As shown in FIG. 6A, it is understood that the area of color gamut of green particularly expands by using the CCFL of large color gamut. Note that, the NTSC ratio is 70% in the case of the combination of typical CCFL and the typical CF, and is 90% in the case of the combination of the CCFL of large color gamut and the typical CF.

Figure 6B:
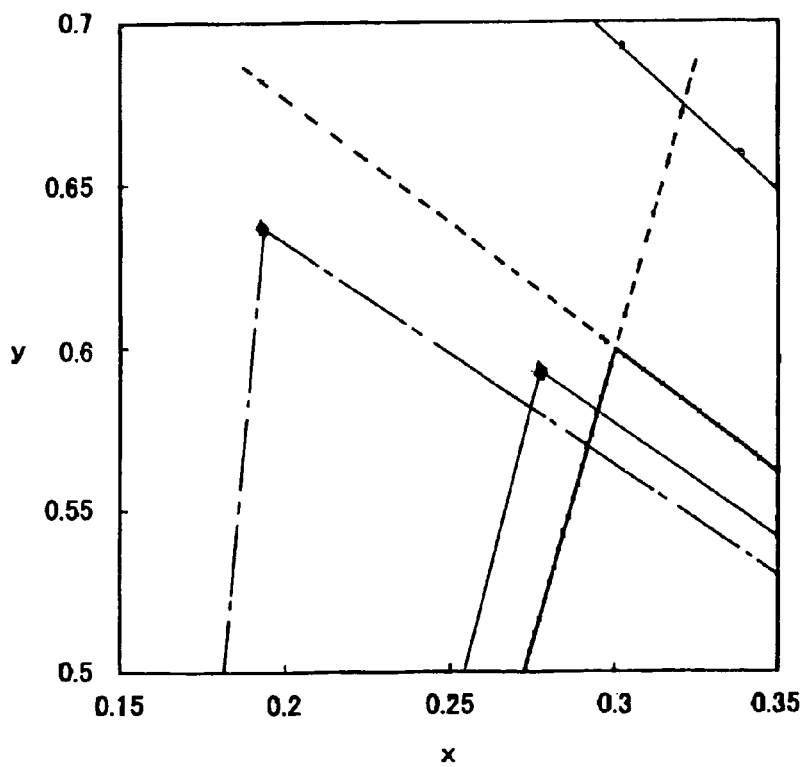

Further, FIG. 6B shows an enlarged view of the area of green in FIG. 6A. As shown in FIG. 6B, it is understood that the color reproduction area of the sRGB standard may not completely be covered in both the cases where either of the CCFLs is used.

In order to cover the color reproduction area of the sRGB standard completely, each vertex of the color reproduction range of a triangle shape, namely, a chromaticity point of each color needs to be within an area having the opposite angle to each vertex with respect to the color reproduction area of the triangle shape of the sRGB standard, as shown in FIG. 6B where the area enclosed with a broken line.

Referring to FIGS. 7A through 7D, the reason why the chromaticity point of each color should exist within this area (hereinafter, termed the opposite angle area) is explained. In FIGS. 7A through 7D, circles indicate the chromaticity points of R, G, B of the color reproduction area (shown with a chain line) of the color LCD device, and slash lines are given to the area where the color reproduction area of the color LCD device covers, in the sRGB color reproduction area of the sRGB standard of a triangle of a bold line.

Figure 7A:
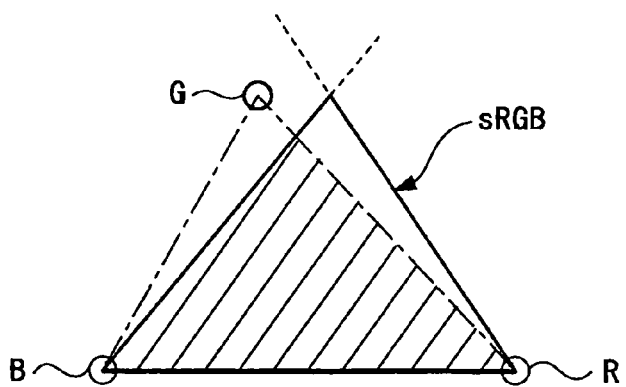
FIGS. 7A through 7D are the drawings to explain that the chromaticity point needs to exist within the diagonal area.

As shown in FIG. 7A, when the chromaticity point G is in the left area outside the area of opposite angle, a part of upper right area in the sRGB area is not covered.

Figure 7B:
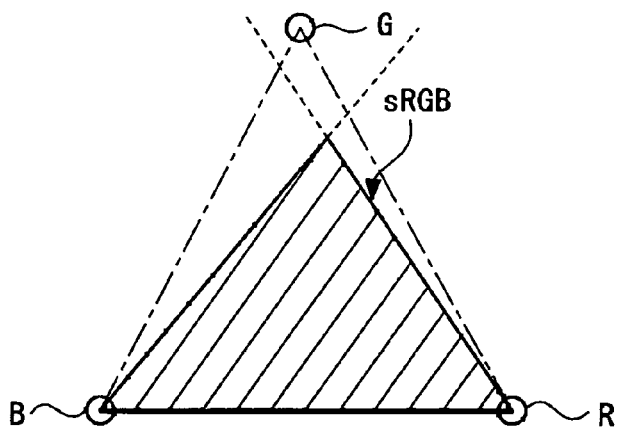
Figure 7C:
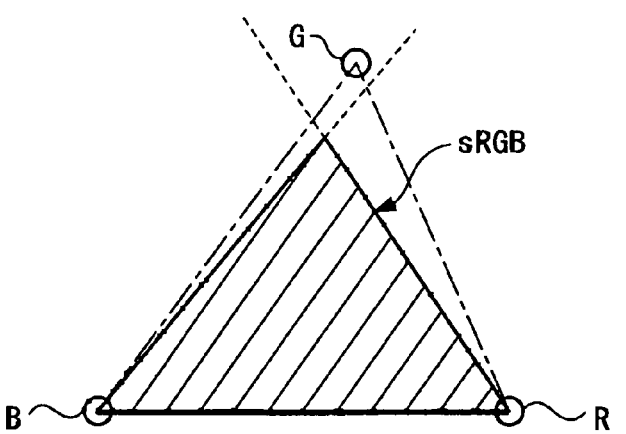

As shown in FIGS. 7B and 7C, when the chromaticity point G is in the area of opposite angle, the sRGB area is covered completely.

Figure 7D:
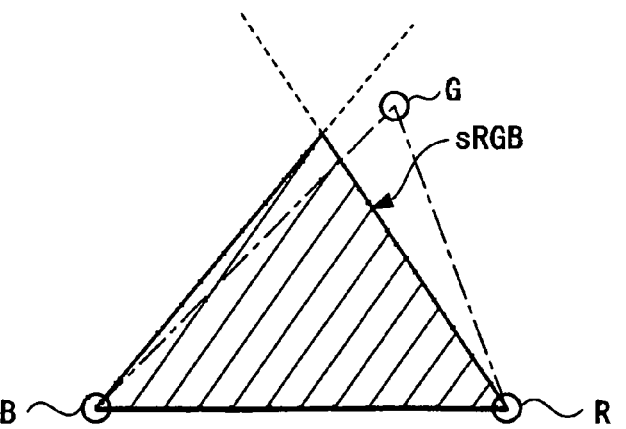

As shown in FIG. 7D, when the chromaticity point G is in the right area outside the area of opposite angle, a part of upper left area in the sRGB area is not covered.

Therefore, it is understood that although the area not covered is caused in the sRGB area when the chromaticity point is not in the area of opposite angle, the whole of sRGB area can be covered when the chromaticity point exists in the area of opposite angle. Further, regardless of the position where the chromaticity point exists in the area of opposite angle, the whole of sRGB area can be covered.

Then, in the color LCD device according to an embodiment of the present invention, not only the fluorescent lamp improved to obtain a color gamut larger than the fluorescent lamp such as the CCFL (Cold Cathode Fluorescent Lamp) of the past is used as the backlight device, but also an optimal color filter for the improved fluorescent lamp is combined and used.

With this, a larger color gamut can be obtained in the color LCD device.

Further, it becomes possible to completely cover the area of the sRGB standard, which has been difficult in the color reproduction with the CCFL of the past.

As the fluorescent lamp, the fluorescent lamp (Cold Cathode Fluorescent lamp or Heat Cathode Fluorescent lamp) in which the color gamut of the fluorescent color is expanded by changing the kind or the amount of mixture of the fluorescent material used for the fluorescent material layer from that of the fluorescent lamp of the past is used. In this way, the color reproduction range of the fluorescent lamp becomes larger than that of the fluorescent lamp of the past.

Specifically, the fluorescent lamp in which the color gamut of the fluorescent color is expanded has the chromaticity point of white light emitted in the vicinity of (x, y)=(0.275, 0.275) in the xy chromaticity diagram of the XYZ color system.

The color filter, in which the kind or the amount of mixture of the pigment of the color filter widely used in the related art is changed and the spectroscopic characteristic is adjusted to be suitable for the distribution of wavelength of the fluorescent color of the fluorescent lamp where the color gamut of the fluorescent color is expanded, is used.

As a material constituting each color filter, the following pigments are listed, for example.

As the R (red) pigment, a monoazo based, disazo based, xanthene based, antorakinon based pigment or the like is used.

As the G (green) pigment, a triphenylmethane based, phthalocyanine based, nitroso based, indamine based pigment or the like is used.

As the B (blue) pigment, a triphenylmethane based, phthalocyanine based, toriarielmethane based pigment or the like is used.

The basic tone of color is determined by the three colors (R, G, B) of main pigments described above, and further a sub-pigment is added to obtain an objective chromaticity adjusted.

As the sub-pigment for the R pigment and G pigment, a monoazo based, disazo based, antorakinon based, isoindorinon based pigment or the like is used as the Y (yellow) pigment. As the sub-pigment for the B pigment, a xanthene based, geokisagen based, kinacridon based, indigoid based pigment and the like is used as the V (purple) pigment.

And, more specifically, the color filter is made to have the following spectroscopic characteristics.

(1) The Blue Color Filter (CFB).

The peak wavelength of the blue filter CFB that selects the wavelength to transmit blue light is 420 nm or more and 455 nm or less.

Further, it is preferable that a half maximum full-width of the peak of spectroscopic characteristic is 110 nm or less, and more preferably it is in the range approximately from 80 nm to 100 nm.

With the above spectroscopic characteristic, since the peak wavelength is in the range on the short wavelength side by approximately 10 nm to 45 nm in comparison with the blue filter typically used in the related art (peak wavelength is 465 nm), the color mixture with the green filter can be reduced and the color gamut of blue can be expanded.

Further, with the chromaticity point of blue in the color reproduction area of the color LCD device being positioned in the area of opposite angle described above, the area of sRGB standard can be covered.

(2) The Green Color Filter (CFG).

The peak wavelength of the green filter CFG that selects the wavelength to transmit green light is 530 nm or more and 550 nm or less.

Further, it is preferable that a half maximum full-width of the peak of spectroscopic characteristics is 120 nm or less, and more preferably it is in the range approximately from 90 nm to 110 nm.

With the above spectroscopic characteristic, since the peak wavelength is in the range on the long wavelength side by approximately 5 nm to 25 nm in comparison with the green filter typically used in the related art (peak wavelength is 525 nm), the color mixture with the blue filter can be reduced.

Further, with the chromaticity point of green in the color reproduction area of the color LCD device being moved to the long wavelength side and positioned in the area of opposite angle as described above, the area of sRGB standard can be covered.

(3) The Red Color Filter (CFR)

The rising wavelength of the red filter CFR that selects the wavelength to transmit red light is 570 nm or in the vicinity of 570 nm.

Further, the transmissivity in the wavelength from 400 nm to 500 nm is almost zero.

It is preferable that the peak wavelength is 600 nm or more.

With such spectroscopic characteristic, the color mixture with the blue filter can be reduced.

Further, with the chromaticity point of red in the color reproduction area of the color LCD device being positioned in the area of opposite angle described above, the area of sRGB standard can be covered.

Figure 8:
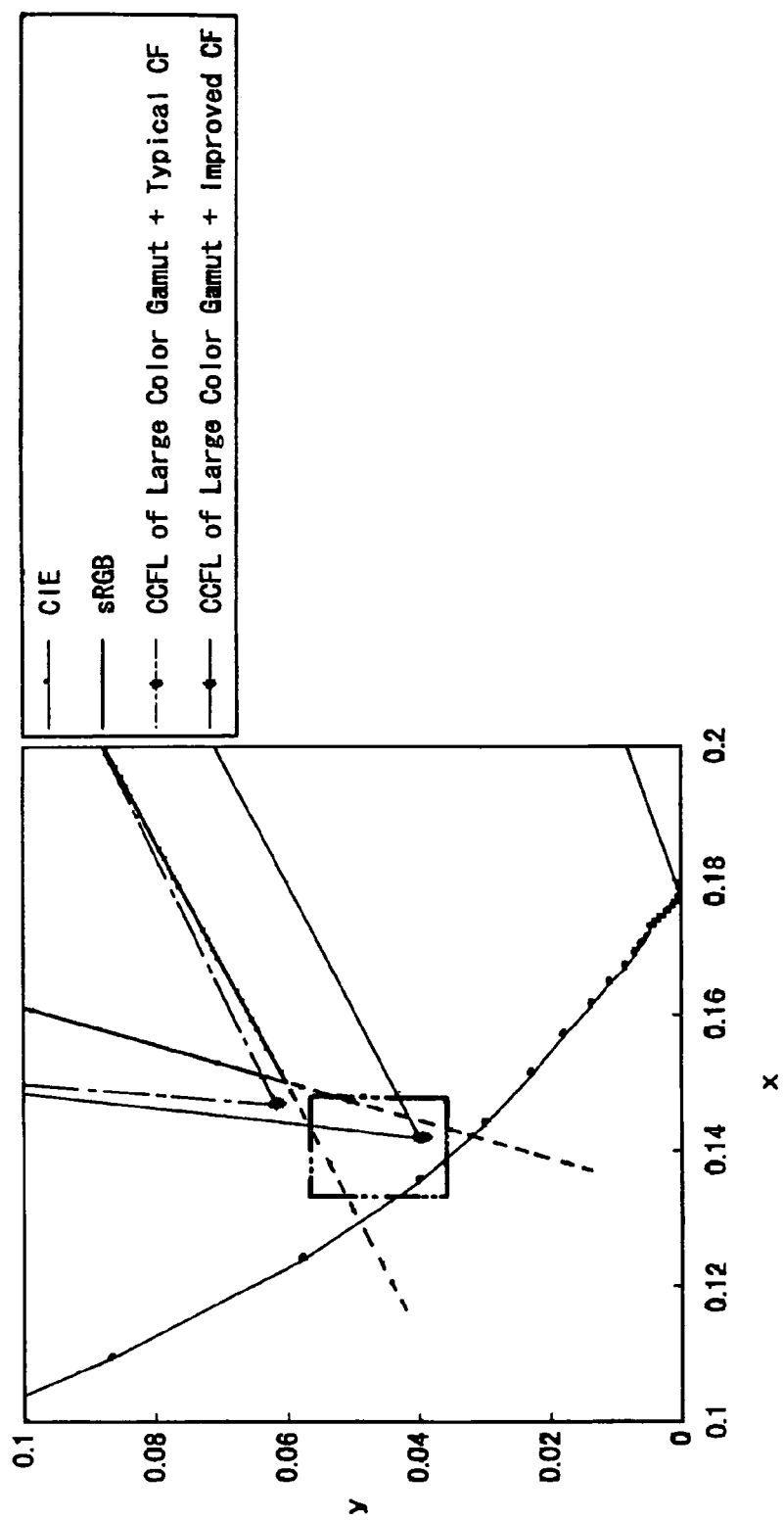
FIG. 8 is an enlarged diagram of the color gamut of blue in the color reproduction range of the color LCD device according to an embodiment of the present invention.

Here, FIG. 8 shows an enlarged view of the color gamut of blue of the color reproduction range with respect to an embodiment of the color LCD device of the present invention in which each of color filters (blue filter CFB, green filter CFG, red filter CFR) is made as described above.

According to FIG. 8, it is understood that the chromaticity point of blue is in the area of opposite angle and covers the area of the sRGB standard.

Figure 9:
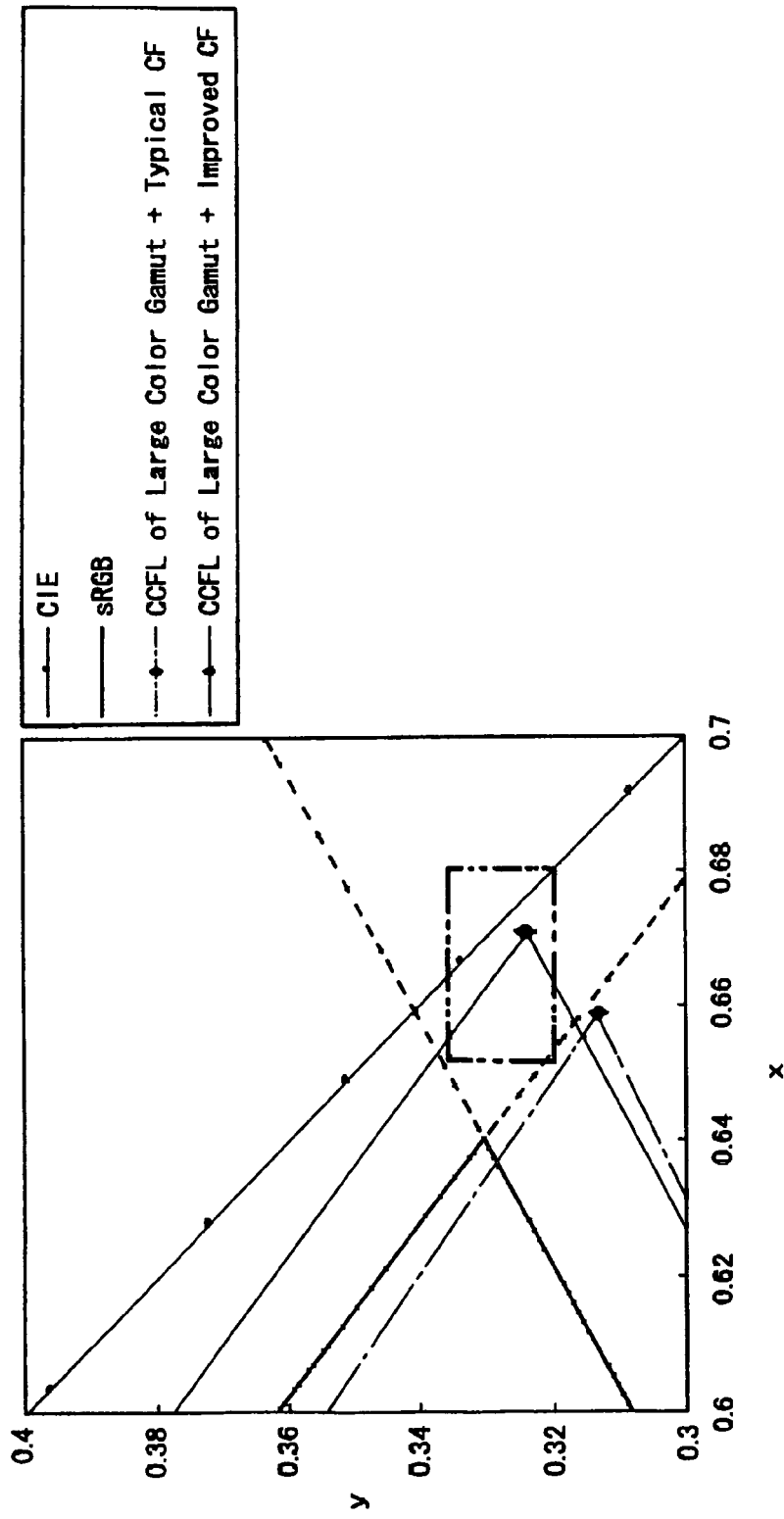
FIG. 9 is an enlarged diagram of the color gamut of green in the color reproduction range of the color LCD device according to an embodiment of the present invention.

Similarly, FIG. 9 shows an enlarged view of the color gamut of red of the color reproduction range.

According to FIG. 9, it is understood that the chromaticity point of red is in the area of opposite angle and covers the area of the sRGB standard.

Figure 10:
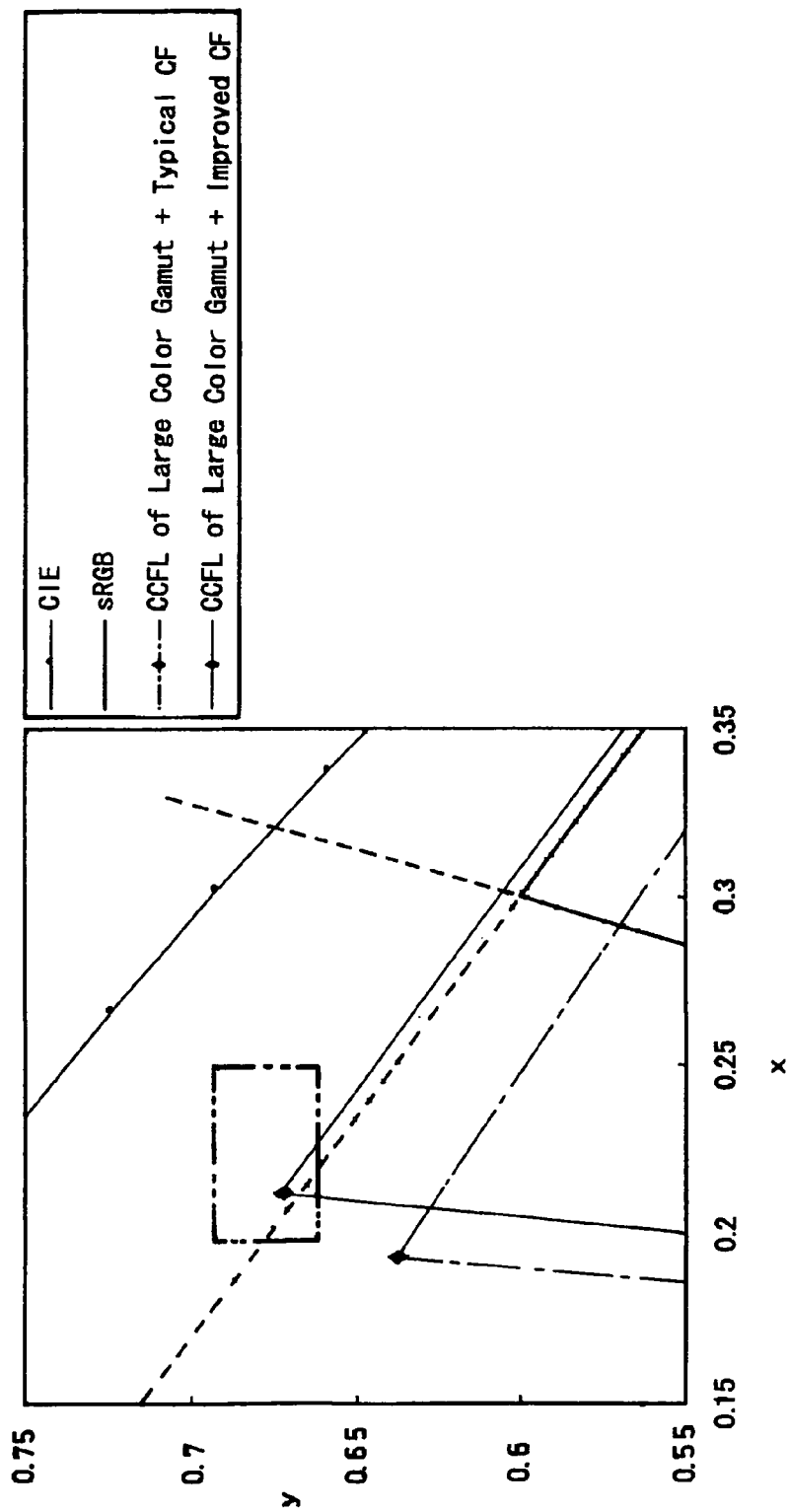
FIG. 10 is an enlarged diagram of the color gamut of red in the color reproduction range of the color LCD device according to an embodiment of the present invention.

Similarly, FIG. 10 shows an enlarged view of the color gamut of green of the color reproduction range.

According to FIG. 10, it is understood that the chromaticity point of green is in the area of opposite angle and covers the area of the sRGB standard.

Note that, if at least one filter of three colors (blue, green, red) is made to have the spectroscopic characteristic described above, the color reproduction range of the color LCD device can be expanded in comparison with the case in which the color filter of the past are used, and the NTSC ratio can also be improved.

Of course, when all the three color filters are made to have the spectroscopic characteristics described above, the color reproduction range of the color LCD device can be expanded sufficiently. Further, the area of the sRGB standard can be covered with the chromaticity points of respective colors.

It is more preferable that a color filter 19 (CFR, CFG, CFB) is made such that each chromaticity point of red, green and blue should be in the predetermined range in the xy chromaticity diagram of the XYZ color system.

First, the chromaticity point of red is in the range indicated with a chain double-dashed line in FIG. 9.

Specifically, in the xy chromaticity diagram of the XYZ color system, the chromaticity point in the red area of light emitted from the backlight light source and transmitted through the color filter is in the range of $0.65 \leq x \leq 0.68$, and $0.32 \leq y \leq 0.355$.

Next, the chromaticity point of green is in the range indicated with the chain double-dashed line in FIG. 10.

Specifically, in the xy chromaticity diagram of the XYZ color system, the chromaticity point in the green area of light emitted from the backlight light source and transmitted through the color filter is in the range of $0.20 \leq x \leq 0.25$, and $0.66 \leq y \leq 0.68$.

Next, the chromaticity point of blue is in the range indicated with the chain double-dashed line in FIG. 8.

Specifically, the chromaticity point in the blue area of light emitted from the backlight light source and transmitted through the color filter is in the range of $0.132 \leq x \leq 0.148$, and $0.038 \leq y \leq 0.058$.

Then, with each chromaticity point of the red area, green area and blue area being positioned in each of the ranges described above, the color gamuts in the areas of three colors expand, and so the area of the sRGB standard is completely covered and the NTSC ratio can be improved to be 95% or more. Further, it becomes possible to correspond to the area of the sYCC standard described above.

Subsequently, an embodiment of the present invention is explained specifically.

Figure 11:
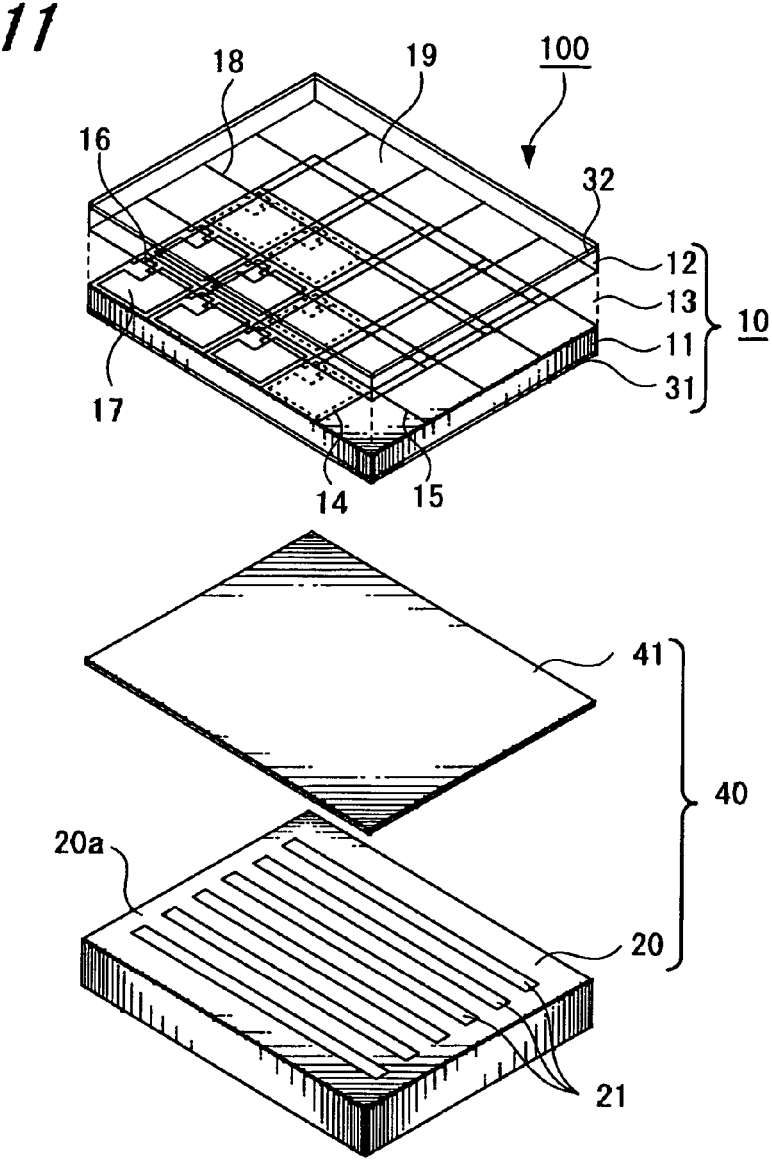
FIG. 11 is a schematic constitutional view (exploded perspective view) of a color LCD device according to an embodiment of the present invention.

FIG. 11 shows a schematic constitutional view (exploded perspective view) of a color LCD device of a backlight type as an embodiment of the present invention.

The color LCD device 100 includes a transmissive color LCD panel 10 and a backlight unit 40 provided on the rear side of the color LCD panel 10.

The transmissive color LCD panel 10 includes: two transparent substrates (a TFT substrate 11 and an opposing electrode substrate 12) made of glass or the like faced each other with a gap in between, and a liquid crystal layer 13 in which, for example, twisted nematic (TN) liquid crystal is injected into the gap to be sealed. Thin film transistors (TFT) 16 arranged in a matrix shape as switching elements and pixel electrodes 17 are formed on the TFT substrate 11.

The TFT transistors 16 are selected sequentially by scanning lines 15 to write the picture signal supplied from signal lines 14 into a corresponding pixel electrode 17.

In the opposing electrode substrate 12, opposing electrodes 18 and a color filter 19 are formed on the inside surface thereof.

The color filter 19 is divided into segments corresponding to each pixel. For example, as shown in FIG. 12, the color filter 19 is divided into three segments of the red filter CFR, green filter CFG and blue filter CFB that are the three primary colors.

Figure 12:
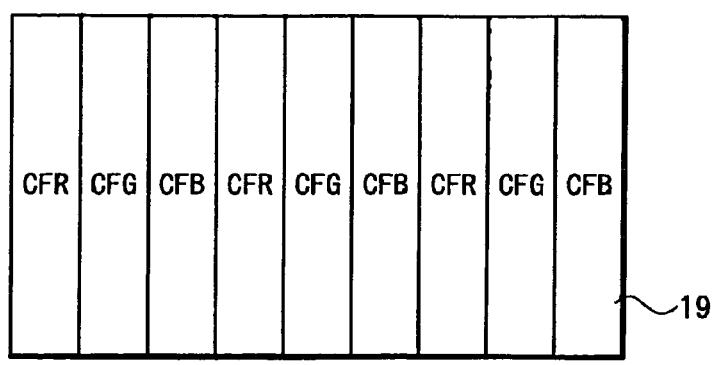
FIG. 12 is a view showing an arrangement pattern of color filters of the color LCD device of FIG. 11.

As for the arrangement patterns of the color filter, other than a striped arrangement as shown in FIG. 12, there are a delta arrangement, square arrangement and the like, though not shown in the figure.

In this color LCD device 100, the transmissive color LCD panel 10 of such structure is positioned between two polarizing plates 31 and 32 and is driven with an active matrix method, while illuminating white light from the rear side using the backlight unit 40, to display the desired picture of full color.

The backlight unit 40 is to illuminate the color LCD panel 10 from the rear side. As shown in FIG. 11, the backlight unit 40 includes: a backlight device 20 provided with a light source, which emits from a light-emitting surface 20a white light mixed with light emitted from the light source, and a diffusion plate 41 laminated on the light-emitting surface 20a of the backlight device.

The diffusion plate 41 equalizes the luminance in the surface-emission by diffusing the white light emitted from the light-emitting surface 20a.

The backlight device 20 includes a number of CCFLs (Cold Cathode Fluorescent Lamps) 21 arranged almost in parallel.

In the color LCD device 100, the longitudinal direction of the CCFL 21 and the stripe direction of the color filter 19 are arranged to be approximately orthogonal.

Note that, the color LCD device according to an embodiment of the present invention is not limited to the above arrangement of CCFL. For example, an arrangement in which the longitudinal direction of the CCFL and the stripe direction of the color filter are approximately parallel may also be possible. Further, with respect to the specific arrangement of the CCFLs 21 in the backlight device 20, such structure as widely known in the related art, for example, the structure described in the above described patent document 1 or the like can be applied.

Figure 13:
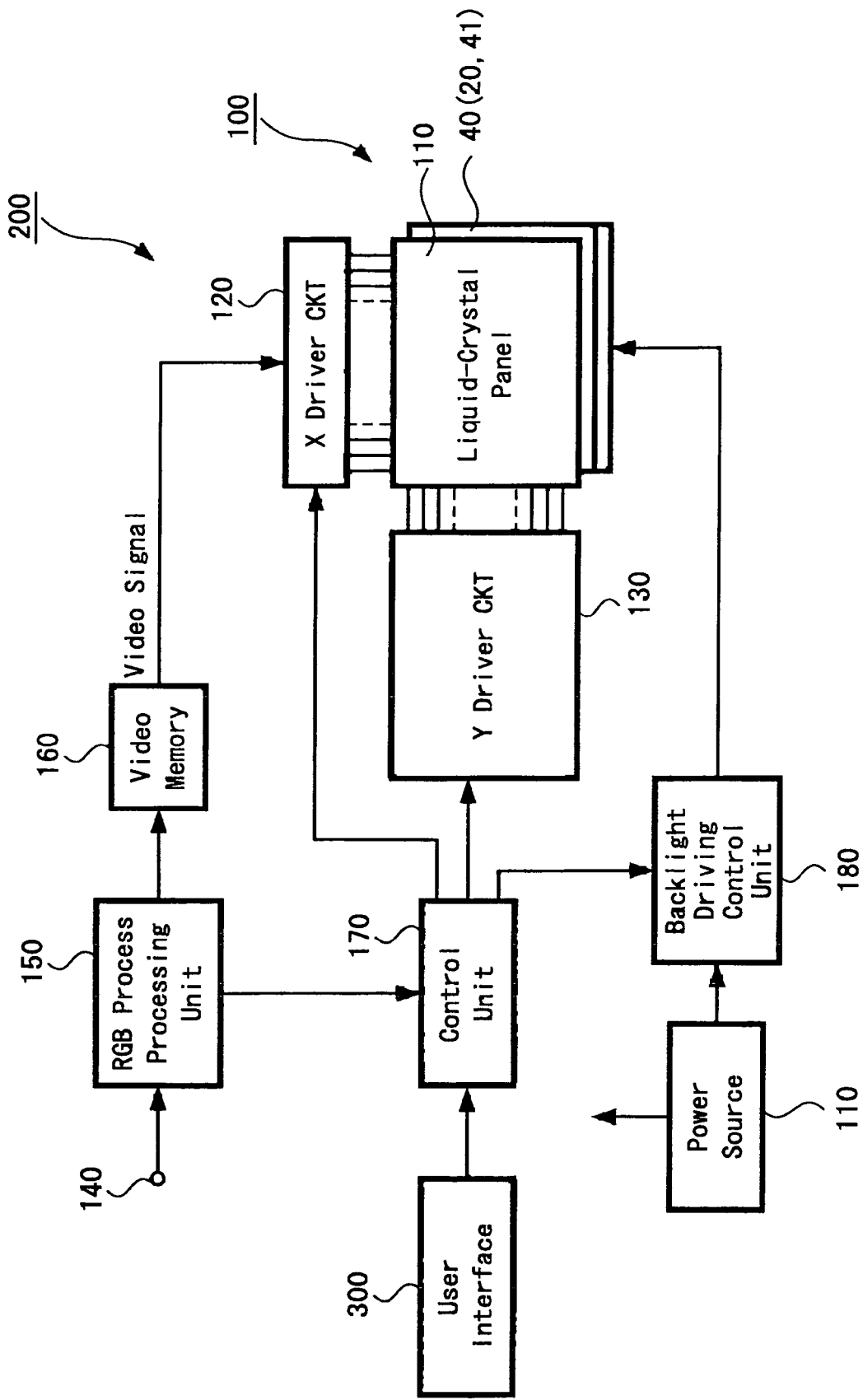
FIG. 13 is a block diagram showing a configuration of a drive circuit of the color LCD device of FIG. 11.

This color LCD device 100 is driven by a drive circuit 200 as shown in FIG. 13, for example.

This drive circuit 200 includes: a power supply unit 110 that supplies voltage to drive a color LCD panel 10 and a backlight device 20, an X driver circuit 120 and Y driver circuit 130 that drive the color LCD panel 10, an RGB-process processing unit 150, to which a picture signal supplied from the outside and a picture signal processed in a picture signal processing unit after receiving in a receiving unit (not shown) included in the color LCD device 100 is supplied through an input terminal 140, an image memory 160 and control unit 170 that are connected to the RGB-process processing unit 150, a backlight drive control unit 180 that drives the backlight device 20 of a backlight unit 40, and the like.

In this drive circuit 200, with respect to the picture signal input through the input terminal 140, the signal processing such as the processing of chrominance and the like are performed in the RGB-process processing unit 150, and further the composite signal is converted into the RGB separate signals suitable for the drive of the color LCD panel 10, to be supplied to the control unit 170 and also supplied to the X driver circuit 120 through the image memory 160.

Further, the control unit 170 controls the X driver circuit 120 and Y driver circuit 130 with a predetermined timing corresponding to the RGB separate signals, thereby driving the color LCD panel 10 with the RGB separate signals supplied to the X driver circuit 120 through the image memory 160, and consequently the image corresponding to the RGB separate signal is displayed.

The backlight drive control unit 180 generates the pulse width modulation (PWM) signal from the voltage applied from the power supply 110 and drives the light source (CCFL) of the backlight device 20.

A user interface 300 is the interface that selects a channel received by a receiving unit (not shown), adjusts the audio output volume that is output from an audio output unit (not shown), and performs a luminance adjustment of white light from the backlight device 20 that illuminates the color LCD panel 10, white balance adjustment and the like.

Furthermore, though not shown in the figure, the color LCD device 100 may include: a receiving unit such as an analogue tuner, digital tuner and the like that receive the terrestrial radio waves and the satellite radio waves; a picture signal processing unit and an audio signal processing unit that respectively process the picture signal and the audio signal that are received by the receiving unit; an audio signal output unit such as a speaker that outputs the audio signal processed by the audio signal processing unit, and the like.

In the color LCD device 100 according to an embodiment of the present invention, particularly, the CCFL of the larger color gamut than the CCFL of the past, namely, the large gamut CCFL described above is used as the CCFL (Cold Cathode Fluorescent Lamp) 21 of the light source of the backlight device 20, and the color filter has a structure different from the color filter of the past to correspond with the CCFL of large color gamut.

Figure 14:
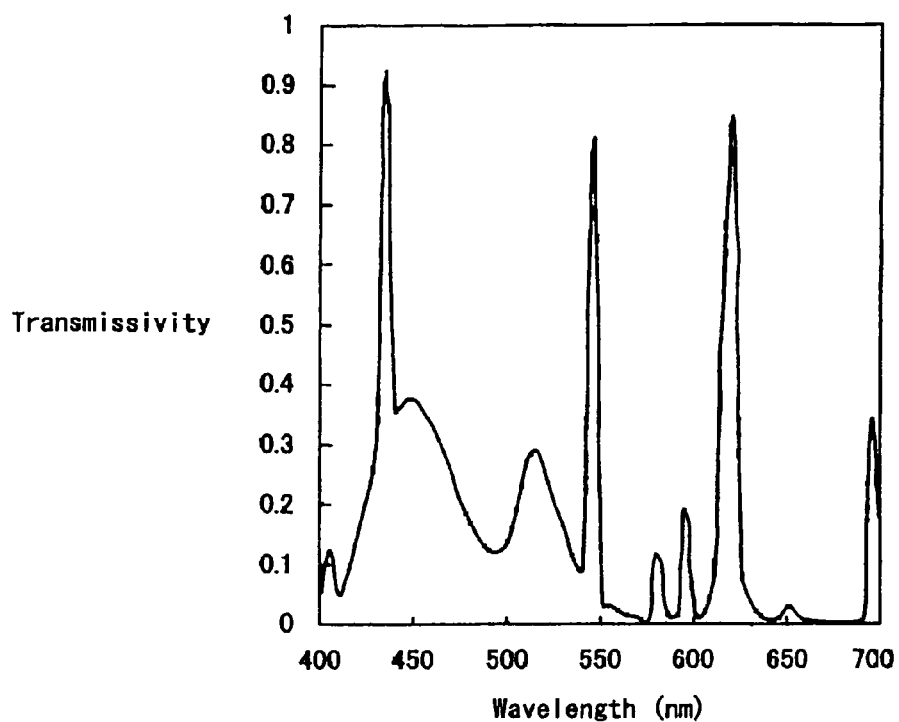
FIG. 14 is a diagram showing a distribution of wavelength (spectrum) of the fluorescent color of an embodiment of the CCFL of large color gamut used in the color LCD device of FIG. 11.

Here, FIG. 14 shows a distribution of wavelength (spectrum) of a fluorescent color of an embodiment of the CCFL of large color gamut used in this embodiment.

Note that, the spectrum shown in FIG. 14 is the same as that of the CCFL of large gamut shown in FIG. 5.

Since this CCFL of large color gamut has the spectrum as shown in FIG. 14, the chromaticity point of white light emitted is in the vicinity of (x, y)=(0.275, 0.275), in the xy chromaticity diagram of the XYZ color system.

For example, the CCFL of large color gamut having the fluorescent color described above can be made as follows.

For example, $YVO_4:Eu$ is used as a red fluorescent material, and for example, $BaMgAl_{10}O_{17}:Eu, Mn$ (BAM:Eu, Mn) is used as a green fluorescent material, and for example, $BaMgAl_{10}O_{17}:Eu$ (BAM:Eu) is used as a blue fluorescent material, and a slurry of fluorescent material that includes fluorescent particle compounds in which these fluorescent particles are mixed is made and poured into the glass tube, thereby forming a fluorescent material layer. The CCFL (Cold Cathode Fluorescent Lamp) is manufactured by using the glass tube in which this fluorescent material layer is formed.

Further, a mixing ratio of each fluorescent particle is adjusted such that the fluorescence chromaticity of the cold cathode fluorescent lamp to be manufactured shall become, for example, (0.275, 0.27) at the color coordinates of fluorescent colors. For example, the mixing ratio may be: 25 to 75 weight percent of the red fluorescent particle, 20 to 60 weight percent of the green fluorescent particle, and 5 to 40 weight percent of the blue fluorescent particle.

The CCFL of large color gamut is obtained with such a composition.

Note that, the method of manufacturing the CCFL of large color gamut is described in detail in Patent Application No. 2004-147887 and the like previously filed by the applicants of the present invention.

Figure 15:
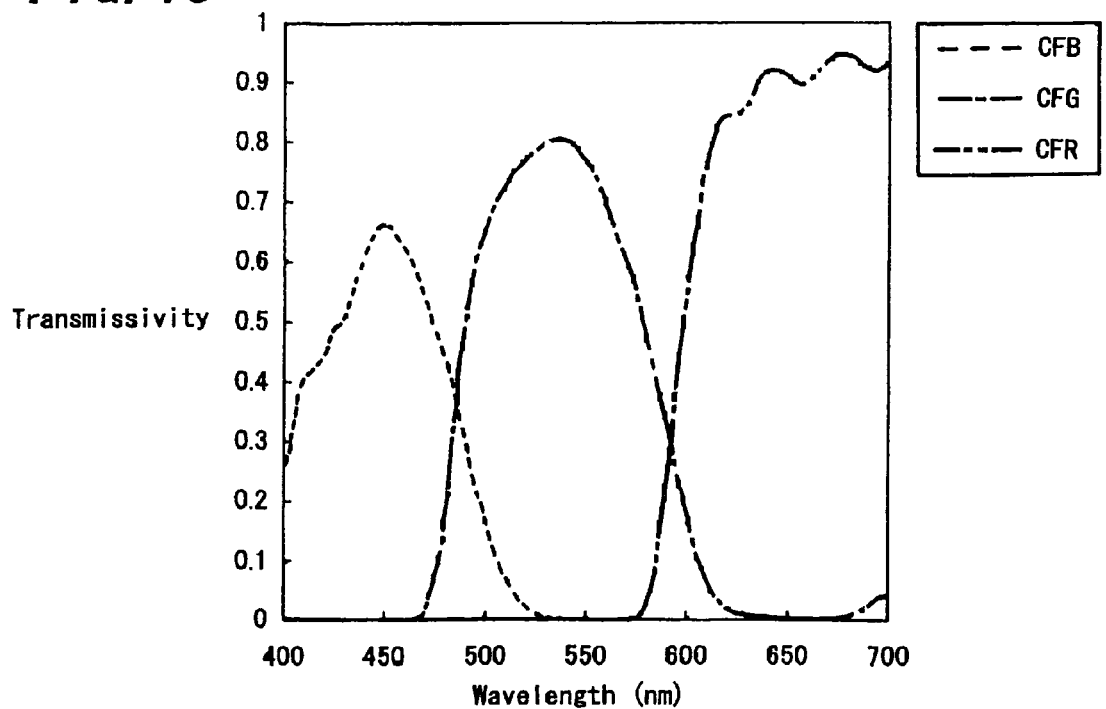
FIG. 15 is a diagram showing the spectroscopic characteristics of the color filters used in the color LCD device of FIG. 11.

In the color LCD device 100 of this embodiment, for example, the color filter 19 provided with the color LCD panel 10 includes the red filter CFR, green filter CFG (the peak is 535 nm) and blue filter (the peak is 445 nm) having the spectroscopic characteristics shown in FIG. 15, respectively. Hereinafter, the color filter having the spectroscopic characteristics shown in FIG. 15 is termed a color filter 19A.

Figure 1:
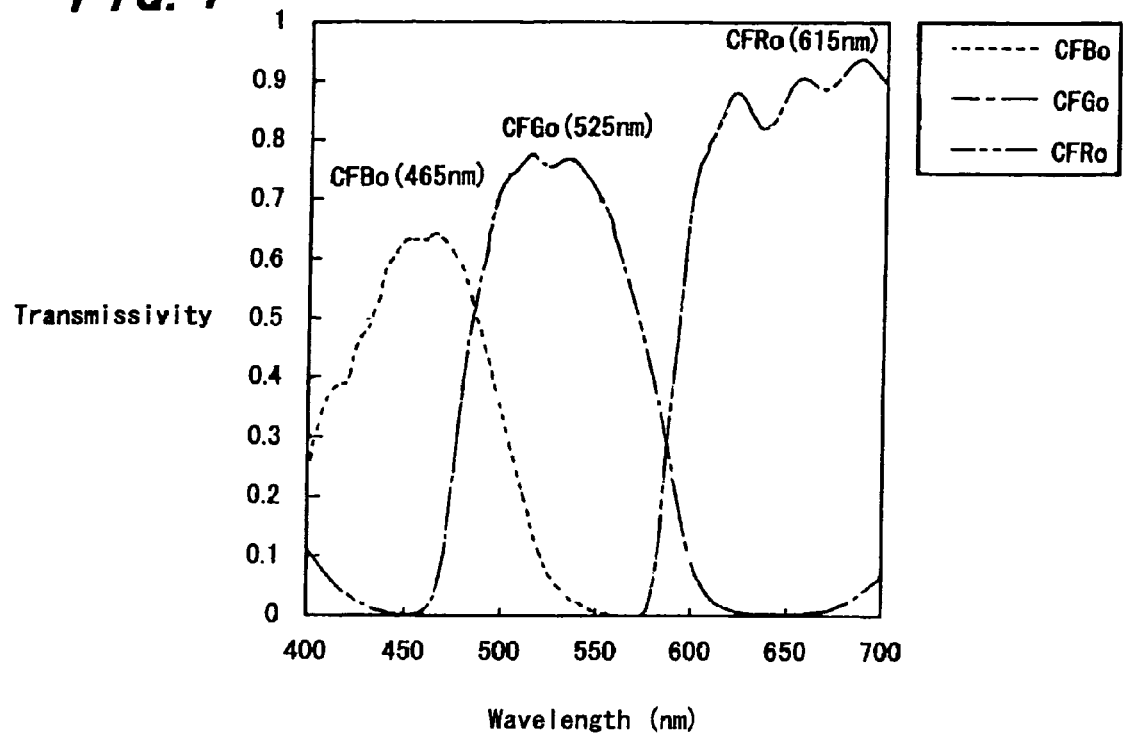
FIG. 1 is a diagram showing spectroscopic characteristics of color filters of a transmissive color LCD device.
Figure 2:
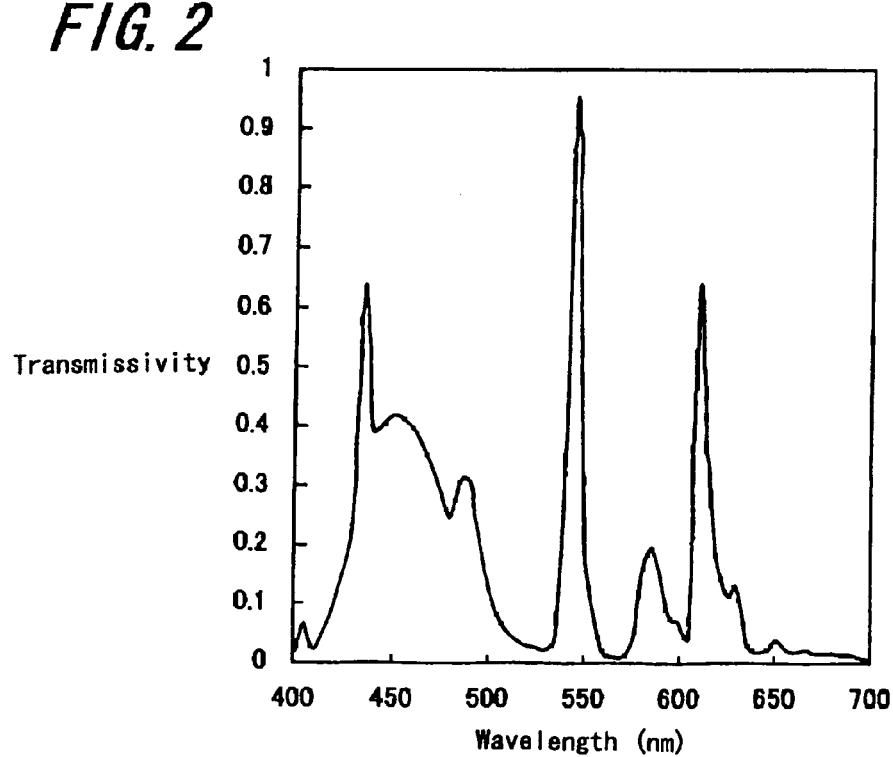
FIG. 2 is a spectrum of white light emitted from a CCFL of three-wavelength gamut type.
Figure 3:
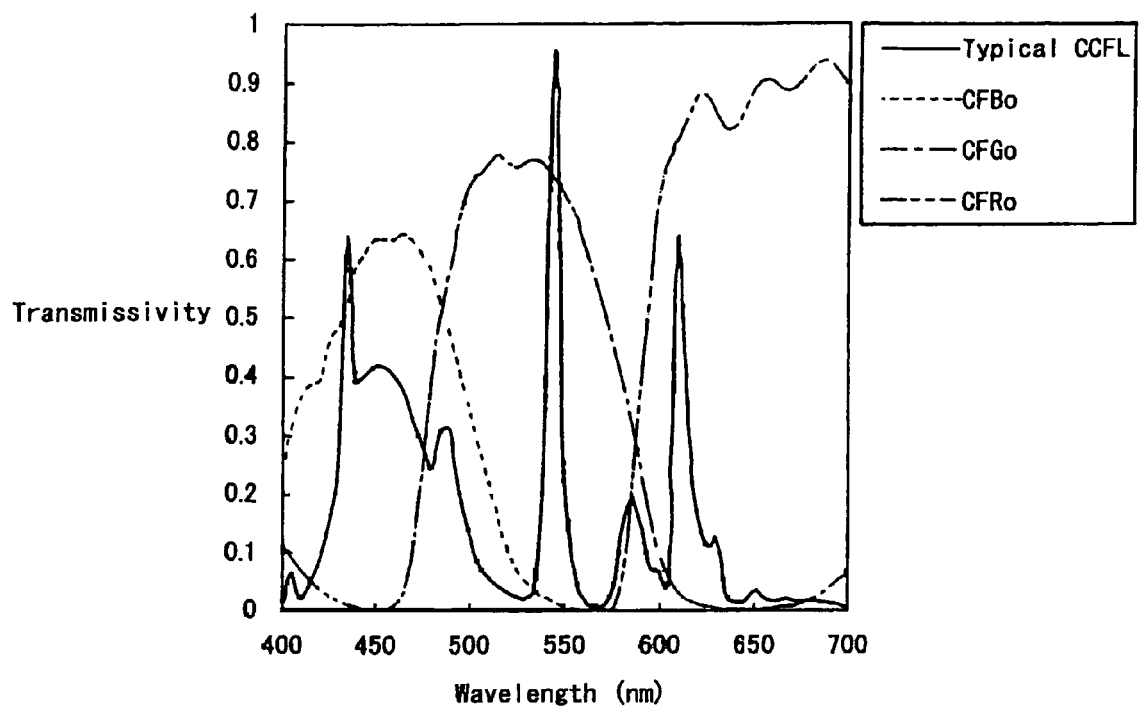
FIG. 3 is a diagram in which the spectroscopic characteristics of the color filters shown in FIG. 1 and the spectrum of the CCFL shown in FIG. 2 are combined to be shown.
Figure 4:
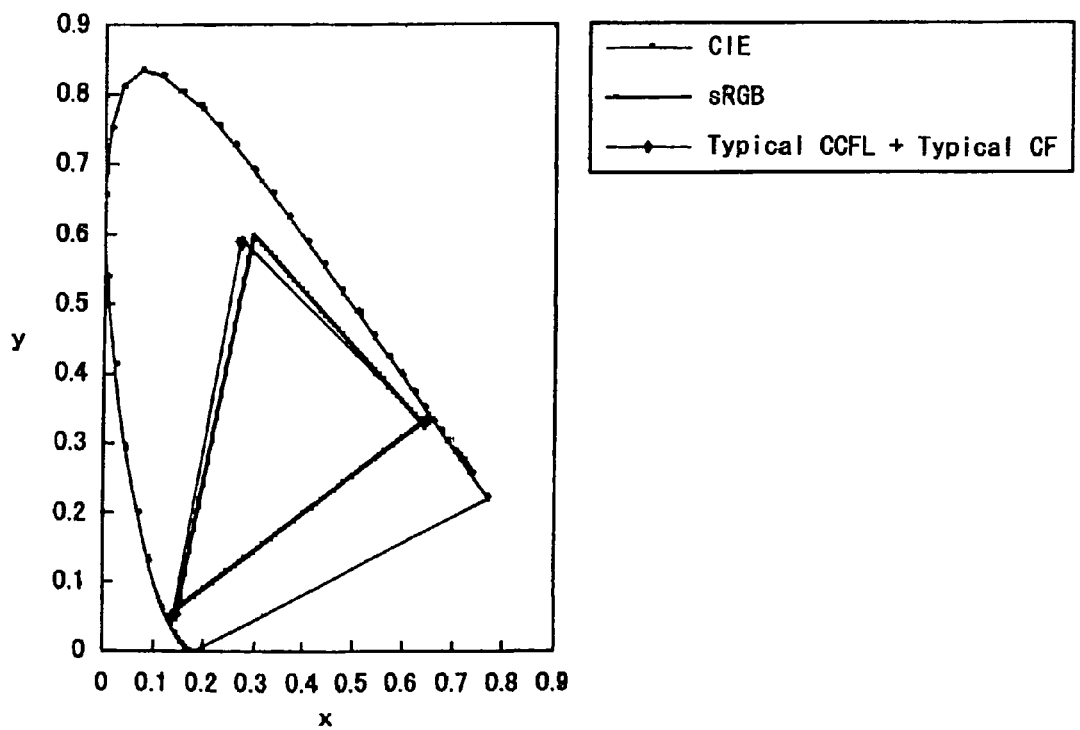
FIG. 4 is the xy chromaticity diagram of the XYZ color system showing color reproduction range of a color LCD device that includes a backlight device in which the CCFL of three-wavelength gamut fluorescent type is a light source.
Figure 16:
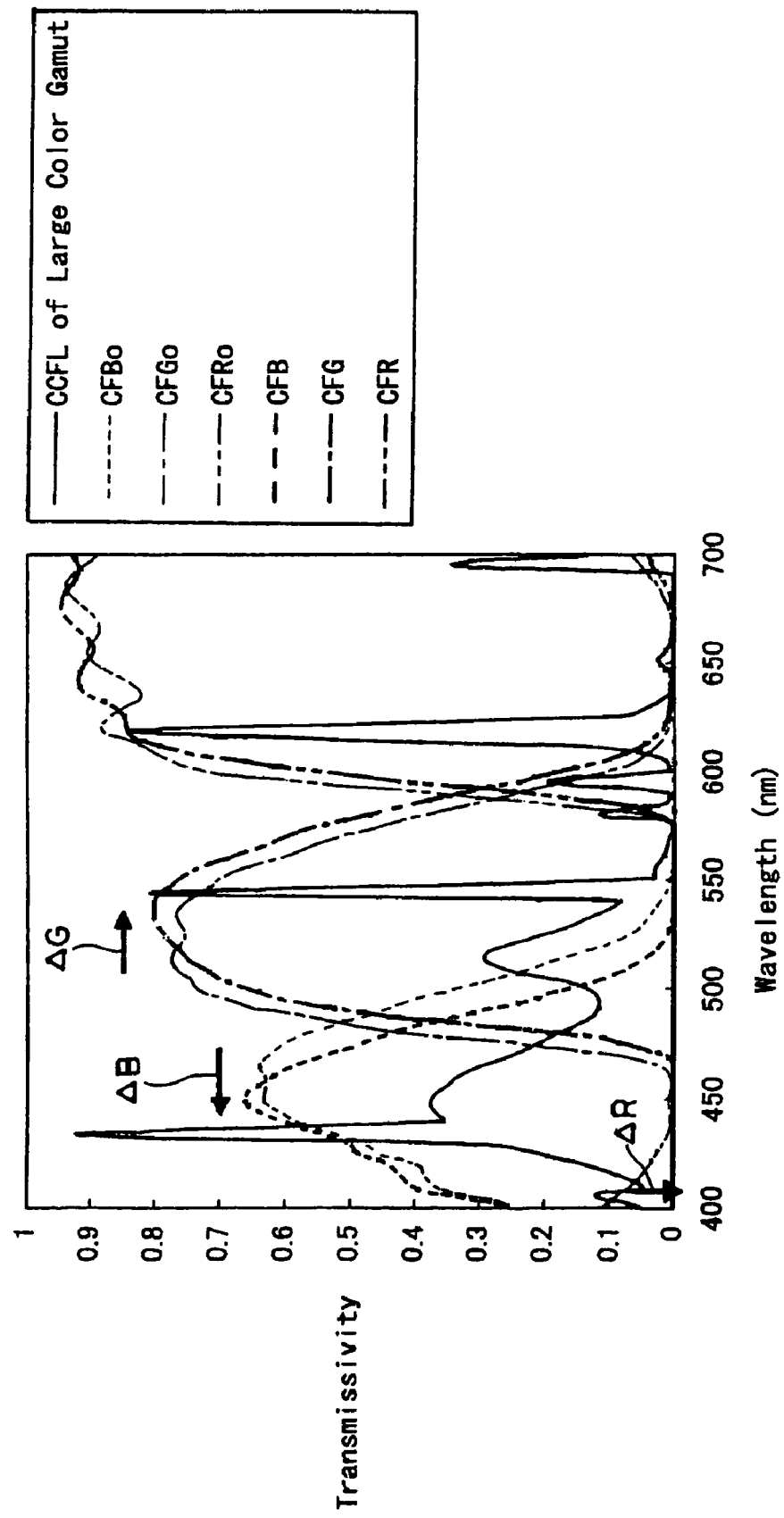
FIG. 16 is a diagram in which the spectrum of FIG. 14, the spectroscopic characteristics of FIG. 15 and the spectroscopic characteristics of FIG. 1 are superimposed.

Further, FIG. 16 shows a diagram in which the spectrum of the CCFL of large color gamut shown in FIG. 14, the spectroscopic characteristics of the color filter 19A shown in FIG. 15 and the spectroscopic characteristics of the color filter of the past shown in FIG. 1 are superimposed.

As shown with an arrow AG in FIG. 16, the transmissive wavelength band of the green filter CFG of the color filter 19A is shifted by approximately 10 nm to the long wavelength side in comparison with the green filter $CFG_0$ of the past.

Hence, the wavelength band of blue emitted from the CCFL of large color gamut is almost prevented from covering the wavelength band of the green filter CFG.

Further, since the wavelength band of green light emitted from the color LCD device 100 is almost determined by the transmissive wavelength band of the green filter CFG and the transmissive wavelength band of the green filter CFG is shifted to the long wavelength side, the wavelength band of green light can be prevented from covering the transmissive wavelength band of the blue filter CFB.

As shown with an arrow ΔB in FIG. 16, the transmissive wavelength band of the blue filter CFG of the color filter 19A is shifted by approximately 20 nm to the short wavelength side in comparison with the blue filter $CFB_0$ of the past.

Hence, the wavelength band of green emitted from the CCFL of large color gamut emits is almost prevented from covering the wavelength band of the blue filter CFB.

Further, since the wavelength band of blue light that emitted from the color LCD device 100 is almost determined by the transmissive wavelength band of the blue filter CFB and the transmissive wavelength band of the blue filter CFB is shifted to the short wavelength side, the wavelength band of the blue light can be prevented from covering the transmissive wavelength band of the green filter CFG.

In other words, color mixture of blue and green can be prevented by combining the color filter 19A with the CCFL of large color gamut.

Further, as shown with an arrow ΔR in FIG. 16, with respect to the red filter CFR of the color filter 19A, the transmissivity in the wavelength from 400 nm to 500 nm is reduced compared with the red filter $CFR_0$ of the past, and the transmissivity is almost zero.

Accordingly, with respect to light entering the red filter CFR, no light having the same wavelength band as the transmissive wavelength band of the blue filter CFB is transmitted through the red filter CFR, and so the color purity of red light transmitted through the red filter CFR is improved.

Furthermore, in this embodiment, in order that each of color filters CFR, CFG, CFB has the spectroscopic characteristics shown in FIGS. 15 and 16, each of color filters CFR, CFG, CFB is made as follows, for example.

(1) The Blue Filter CFB.

The amount of V (purple) pigment added to the B (blue) pigment was adjusted such that the amount of shift of the peak wavelength from that of the blue filter $CFB_0$ of the past should be approximately 20 nm. Ultimately, the composition of the pigment became 5 to 10 weight percent in the whole color resist. The other components of the color resist were organic solvent, dispersing agent, binder resin and the like.

Note that, B-15 was used as the B (blue) pigment, and V-23 was used as the V (purple) pigment.

(2) The Green Filter CFG.

The amount of Y (yellow) pigment added to the G (green) pigment was adjusted such that the amount of shift of the peak wavelength from that of the green filter $CFG_0$ of the past should be approximately 10 nm. Ultimately, the composition of the pigment became 5 to 10 weight percent.

Note that, G-36 was used as the G (green) pigment, and Y-150 was used as the Y (yellow) pigment.

(3) The Red Filter CFR.

The amount of Y (yellow) pigment added to the R (red) pigment was adjusted to reduce the absorption on the short wavelength side. Ultimately, the composition of the pigment became 5 to 10 weight percent.

Note that, R-254 was used as the R (red) pigment, and Y-139 was used as the Y (yellow) pigment.

The material of each pigment such as B-15, V-23 and the like is listed in a typical pigments list, and the one produced by DAINICHISEIKA COLOR & CHEMICALS MFG. Co., Ltd. is commercially available, for example.

Hereupon, the color LCD was manufactured practically, and the characteristics thereof were studied.

Figure 17:
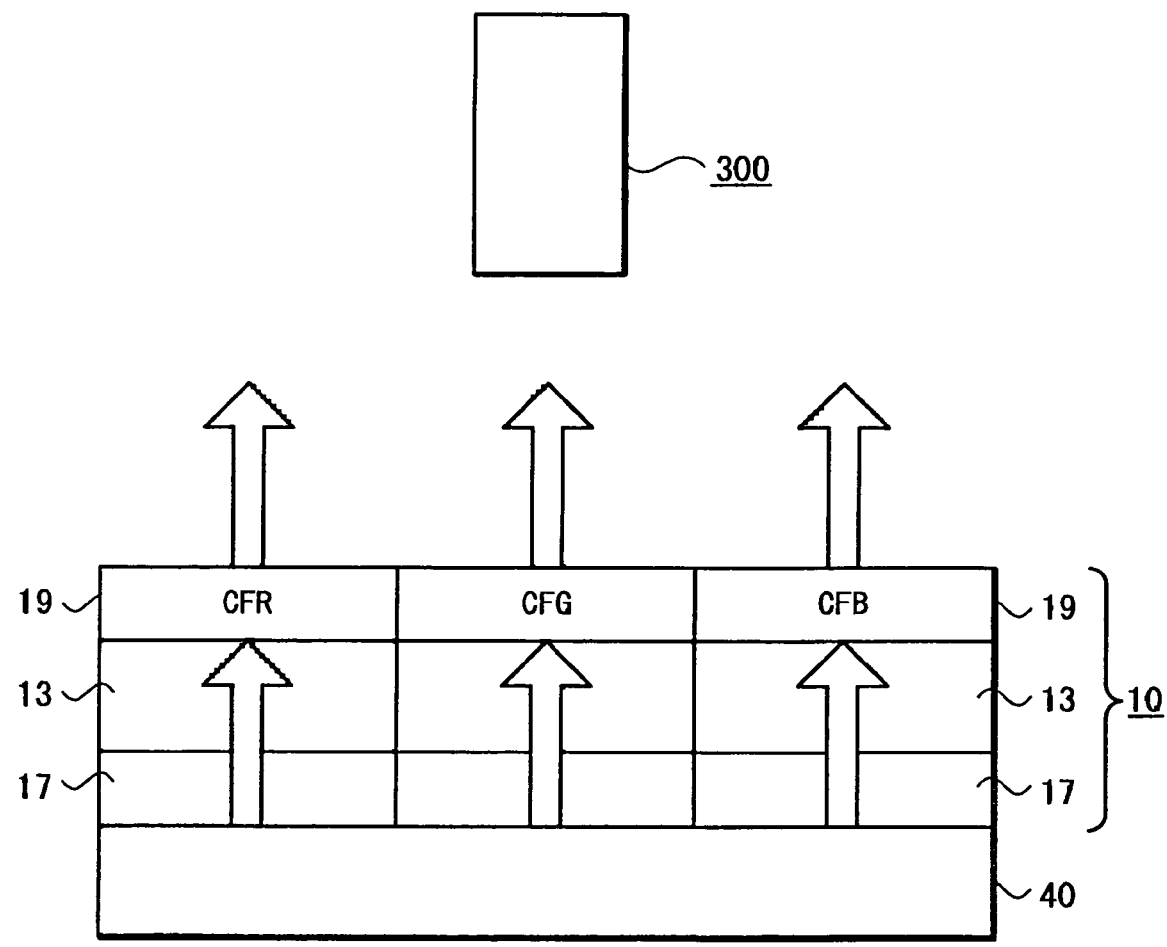
FIG. 17 is a schematic view showing an arrangement of a color luminance meter, when the spectroscopic characteristics are measured.

As shown in the schematic view of FIG. 17, the color luminance meter 300 was disposed above the color filter 19 of the color LCD device 100 and the spectroscopic characteristics were measured.

Further, the spectroscopic characteristic was plotted in the chromaticity diagram of the XYZ color system and the NTSC ratio was obtained from the chromaticity diagram of the XYZ color system.

Then, regarding the case in which the CCFL of large color gamut was used as the backlight light source and the color filter of the past (typical CF) was used, and regarding the case in which the CCFL of large color gamut was used as the backlight light source and the color filter of this embodiment (improved CF) was used, color LCD devices were made to measure the spectroscopic characteristics by the measurement method described above, respectively.

Figure 18:
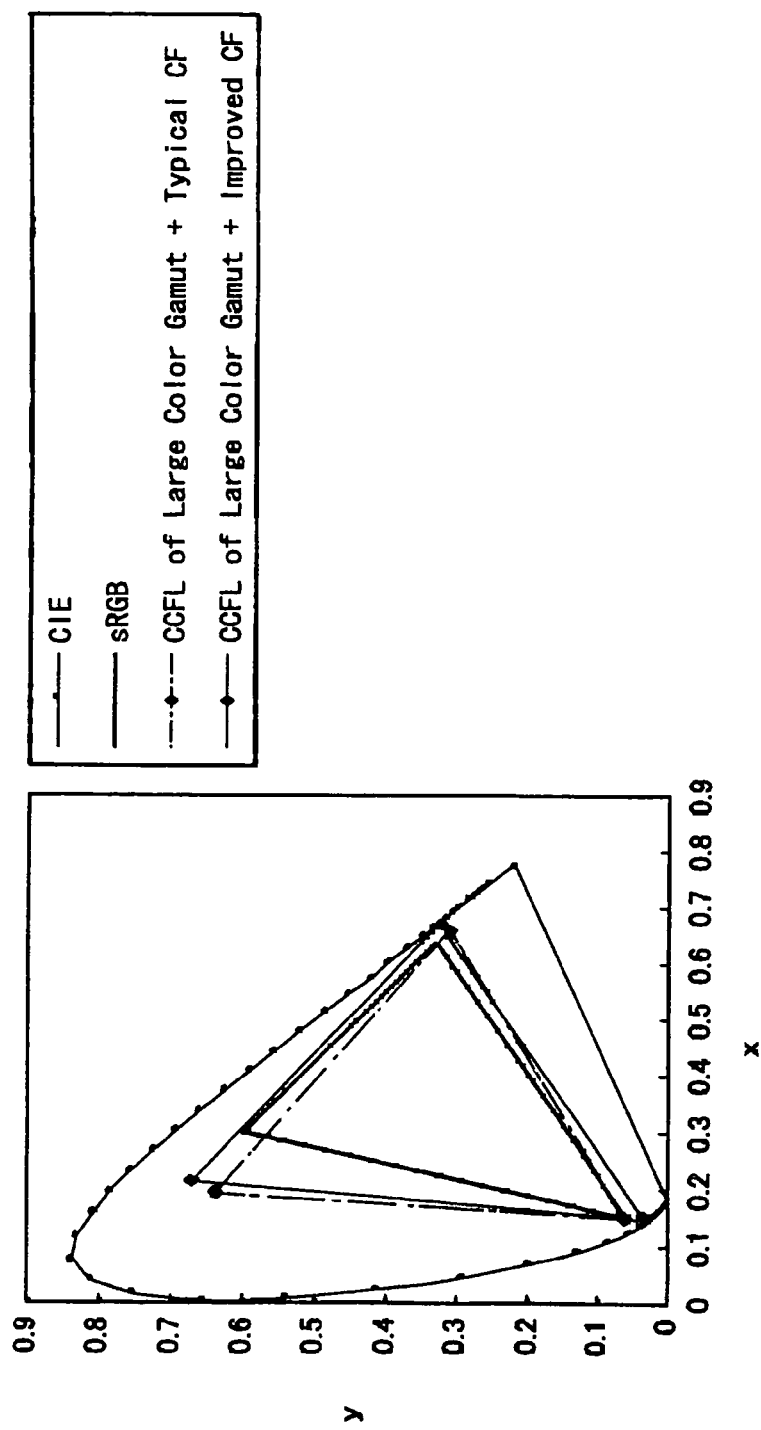
FIG. 18 is a diagram in which the spectroscopic characteristics of the color LCD device are plotted in the chromaticity diagram of the XYZ color system, in the case where the color filter of the past is employed and in the case where the color filter of the spectroscopic characteristics of FIG. 15 is employed.

FIG. 18 shows the results of measurement, in which each spectroscopic characteristic is plotted in the chromaticity diagram of the XYZ color system.

According to FIG. 18, the area of the sRGB standard was completely covered in the case where the filter of this embodiment (improved CF) was used.

Further, the NTSC ratio was 100% in this case, which shows improvement by approximately 10% in comparison with the filter of the past.

According to the color LCD device 100 of the above described embodiment, since the color LCD device 100 includes the CCFL 21 made of the CCFL of large color gamut whose spectrum is shown in FIG. 14 as the light source of the backlight device 20 and the color filter 19A (CFR, CFG, CFB) in which the spectroscopic characteristic of the color filter 19 has been improved corresponding to the CCFL of large gamut, color mixture between respective colors can be controlled and the color reproduction range can be expanded, in comparison with the case where the CCFL of large color gamut and the color filter of the past are used.

Accordingly, it becomes possible to cover the area of the sRGB standard completely.

Further, the NTSC ratio increases to be more than 100% and to correspond to the area of the sYCC standard.

Note that, although the CCFL (Cold Cathode Fluorescent Lamp) of large color gamut is used as the backlight light source in the above described embodiment, the heat cathode fluorescent lamp, in which the fluorescent material layer is formed similarly to the CCFL of large color gamut, can be used as the backlight light source. In this case, the color gamut of the backlight light source can also be expanded by selecting the composition of the fluorescent material layer.

Furthermore, the present invention can be applied not only to the structure directly illuminated with light from the fluorescent lamps (tubes) provided in the backlight device, but also to the structure indirectly illuminated with light from the fluorescent lamps through a light-guiding plate.

Further, structures of related art can also be applied to the arrangement and the like of the fluorescent lamps in the backlight light source.

In the above described embodiment, all of the filters of three colors are those color filters CFR, CFG and CFB whose spectroscopic characteristics are improved, however, the present invention includes such structure that at least one of those three color filters is made as the color filter whose spectroscopic characteristic is improved.

In this way, when using the color filter in which at least one of three colors has been improved, such effectiveness of expanding the color reproduction range of the color LCD device is obtained, in comparison with the color filter of the past.

It should be understood by those skilled in the art that various modifications, combinations, sub-combinations and alterations may occur depending on design requirements and other factors insofar as they are within the scope of the appended claims or the equivalents thereof.

What is claimed is:

1. A color liquid crystal display device, comprising:
   a transmissive color liquid crystal display panel that comprises:
      a color filter divided into segments, wherein each segment corresponds to a pixel and comprises a red filter, a green filter, and a blue filter; and
      a liquid crystal display backlight light source which emits white light and illuminates said color liquid crystal display panel from a rear side,
   wherein said backlight light source includes a fluorescent lamp in which a chromaticity point of the white light emitted is in the vicinity of (x, y)=(0.275, 0.275) in an xy chromaticity diagram of an XYZ color system, and
   wherein each of said red filter, said green filter, and said blue filter selects a wavelength to transmit respective red light, green light and blue light, and at least said blue filter has a spectroscopic characteristic with a peak wavelength that is 420 nm or more and 455 nm or less and a half maximum full-width that is 110 nm or less.

2. The color liquid crystal display device according to claim 1,
   wherein a peak wavelength of a green filter that selects a wavelength to transmit green light is 530 nm or more and 550 nm or less, and a rising wavelength of a red filter that selects a wavelength to transmit red light is 570 nm or in the vicinity of 570 nm and a transmissivity of the red filter is almost zero at a wavelength of 400 nm or more and 500 nm or less.

3. The color liquid crystal display device according to claim 2,
   wherein, with respect to light emitted from said backlight light source and transmitted through said color filter,
   a chromaticity point in blue area is within a range of $0.132 \leq x \leq 0.148$, $0.038 \leq y \leq 0.058$; chromaticity point in green area is within a range of $0.20 \leq x \leq 0.25$, $0.66 \leq y \leq 0.68$; and a chromaticity point in red area is within a range of $0.65 \leq x \leq 0.68$, $0.32 \leq y \leq 0.335$ in the xy chromaticity diagram of the XYZ color system.

4. The color liquid crystal display device according to claim 1,
   wherein a chromaticity point in blue area of light emitted from said backlight light source and transmitted through said color filter is within a range of $0.132 \leq x \leq 0.148$, $0.038 \leq y \leq 0.058$ in the xy chromaticity diagram of the XYZ color system.

5. The color liquid crystal display device according to claim 1,
   wherein a transmitting ratio of an overlapping wavelength between said blue filter and said green filter is less than 38%.

6. A color liquid crystal display device, comprising:
   a transmissive color liquid crystal display panel that comprises:
      a color filter divided into segments, wherein each segment corresponds to a pixel and comprises a red filter, a green filter, and a blue filter; and
      a liquid crystal display backlight light source which emits white light and illuminates said color liquid crystal display panel from a rear side,
   wherein said backlight light source includes a fluorescent lamp in which a chromaticity point of the white light emitted is in the vicinity of $(x, y)=(0.275, 0.275)$ in an xy chromaticity diagram of an XYZ color system, and
   wherein each of said red filter, said green filter, and said blue filter selects a wavelength to transmit respective red light, green light and blue light, and at least said green filter has a spectroscopic characteristic with a peak wavelength that is 530 nm or more and 550 nm or less and a half maximum full-width that is 120 nm or less.

7. The color liquid crystal display device according to claim 6,
   wherein a chromaticity point in green area of light emitted from said backlight light source and transmitted through said color filter is within a range of $0.20 \leq x \leq 0.25$, $0.66 \leq y \leq 0.68$ in the xy chromaticity diagram of the XYZ color system.

8. The color liquid crystal display device according to claim 6,
   wherein a transmitting ratio of an overlapping wavelength between said blue filter and said green filter is less than 38%.

9. The color liquid crystal display device according to claim 6,
   wherein a transmitting ratio of an overlapping wavelength between said red filter and said green filter is less than 30%.

10. A color liquid crystal display device, comprising:
    a transmissive color liquid crystal display panel that comprises:
       a color filter divided into segments, wherein each segment corresponds to a pixel and comprises a red filter, a green filter, and a blue filter; and
       a liquid crystal display backlight light source which emits white light and illuminates said color liquid crystal display panel from a rear side,
    wherein said backlight light source includes a fluorescent lamp in which a chromaticity point of the white light emitted is in the vicinity of $(x, y)=(0.275; 0.275)$ in an xy chromaticity diagram of an XYZ color system, and
    wherein each of the said red filter, said green filter, and said blue filter selects a wavelength to transmit respective red light, green light and blue light, and at least the red filter has a spectroscopic characteristic with a peak wavelength that is 600 nm or more and a rising wavelength that is 570 nm or in the vicinity of 570 nm, and a transmissivity of the red filter is almost zero at a wavelength of 400 nm or more and 500 nm or less.

11. The color liquid crystal display device according to claim 10,
    wherein a chromaticity point in red area of light emitted from said backlight light source and transmitted through said color filter is within a range of $0.65 \leq x \leq 0.68$, $0.32 \leq y \leq 0.335$ in the xy chromaticity diagram of the XYZ color system.

12. The color liquid crystal display device according to claim 10,
    wherein a transmitting ratio of the overlapping wavelength between said red filter and said green filter is less than 30%.

* * * * *